United States Patent [19]

Telingator et al.

[11] Patent Number: 5,559,692
[45] Date of Patent: Sep. 24, 1996

[54] CUSTOMIZABLE DATA GATHERING METHOD WHICH ALLOWS THE USER TO DEFINE THE CLASSES OF DATA WHICH ARE GATHERED

[75] Inventors: Eric Telingator; Owen Ward; Edward J. Ross, all of Boulder, Colo.

[73] Assignee: Core Systems, Inc., Boulder, Colo.

[21] Appl. No.: 318,229

[22] Filed: Oct. 5, 1994

[51] Int. Cl.⁶ .......................... G06F 12/00; G06F 17/30; G06F 3/00
[52] U.S. Cl. ................... 364/401 R; 364/146; 395/600
[58] Field of Search ........................ 364/400, 401, 364/406; 395/156, 160, 161, 146

[56] References Cited

U.S. PATENT DOCUMENTS

| | | | |
|---|---|---|---|
| 4,821,211 | 4/1989 | Torres | 364/521 |
| 4,899,292 | 2/1990 | Montagna et al. | 364/521 |
| 4,918,602 | 4/1990 | Bone et al. | 364/401 |
| 5,220,675 | 6/1993 | Padawer et al. | 395/800 |
| 5,432,897 | 7/1995 | Tatsumi et al. | 395/140 |

Primary Examiner—Gail O. Hayes
Assistant Examiner—Steven R. Yount
Attorney, Agent, or Firm—Dorn, McEachran, Jambor & Keating

[57] ABSTRACT

A customizable data gathering method utilizes a transportable computing device to store a user-defined menu and data table structure with pointers to define a hierarchical tree model. Once defined the tree model serves as a data template that guides a field inspector in collecting data. The template is created by a user without having to program the computing device.

4 Claims, 3 Drawing Sheets

CUSTOMIZABLE DATA GATHERING METHOD WHICH ALLOWS THE USER TO DEFINE THE CLASSES OF DATA WHICH ARE GATHERED

BACKGROUND OF THE INVENTION

This invention concerns a method of inspection and/or data gathering for use with mobile computing devices such as pen computers. The need exists for accurate, detailed and timely field data such as site and equipment inspections, incident report, surveys, order filling and the like. Mobile computing devices such as pen computers have been used for this purpose, allowing field inspectors to enter data into the computer as they make their in situ inspections. The computing device must, of course, be programmed to accept the data and store it in some usable format. Programming the machines has proven to be a problem for users as they try to create a program that reflects their particular business needs.

General-purpose database software, such as FoxPro from Microsoft Corporation or dbase from Borland, can be used to program the mobile computers used for data collection. These types of programs allow users complete freedom in how to design data tables, input screens, menus and the like. They then encourage the user to generate an application from these elements. An application is a program written in a language that is part of the general-purpose program (i.e., FoxPro has its own programming language; FoxPro itself runs programs written in that language). Thus, an "application" is a program within a program.

The general-purpose software includes an application generator that will do much of the detail work of creating the application from the basic screens, menus etc. that a user creates. Nonetheless, application generation is usually beyond the capability of the ordinary user and only basic applications can be generated this way. More complex applications require detailed knowledge of the programming language. An entire industry has arisen to develop custom-written applications for users. But regardless of how it's written, each application has its own code, in the database programming language, for accomplishing its mission.

Creation of this application code, whether done professionally or by the user, is time-consuming and costly when done properly and potentially disastrous when done poorly. Moreover, the finished application will do one job and one job only. When the task changes, the application has to be modified or re-written. It would be preferable to have an application that does not change from one job to another but can still accommodate the specific needs of individual users. That is what the present invention does.

SUMMARY OF THE INVENTION

The present invention product falls somewhere between the completely open-ended, free-form generic database software and a custom-written, specific application program. The former leaves the user completely at sea, demanding a strong understanding of how to use the software while the latter boxes the user in to one specific use. The present invention provides screen layouts, menu formats and a data structure that free the user from having to know how to create these things. At the same time, however, the invention provides the flexibility for the user to define what data he needs and what exact items go into the menu format. Thus, a user's knowledge of his business can be incorporated into the program without having to have a detailed knowledge of the database software. This is done by imposing on the user a tree data structure. This structure allows the single application of the present invention to accommodate the specific needs of individual users while retaining the relative ease of use of a customized application.

The program of the present invention is a pen based program that functions for any custom inspection and/or survey job or task. The program responds to user-defined structural data tables. The structural data dictate how information is presented on the screen to the user and what information is collected in the field. By manipulating the data tables, data collection programs can be created for a wide range of tasks. The program is unique in that a simple-to-use graphical PC program allows an organization to define exactly what field information needs to be collected and how it should be presented to the user. The program in the pen based computer uses the custom-defined information to determine the menu prompts presented to the user, as well as how the field data should be saved for later transmission.

BRIEF DESCRIPTION OF THE DRAWINGS

FIG. 1 is a diagrammatic sketch illustrating the tree data structure used by the present invention.

DETAILED DESCRIPTION OF THE INVENTION

Figure 4:
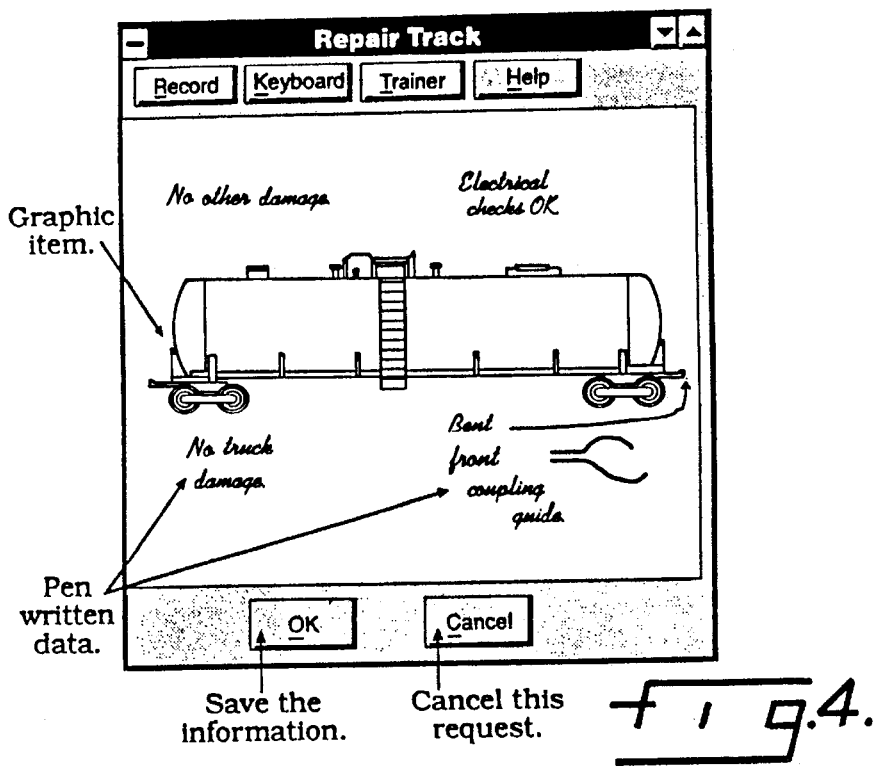
FIG. 4 is a sample of a graphical information screen for collection of practical data.

The present invention is based on a tree data model as illustrated in FIG. 1 for a railroad car inspection task. The tree data model relies on a series of levels, going from general to specific with respect to the details of a specific task. Each level has one or more objects. An object is associated with a category of information needed in a particular task. Objects on all but the top level will include one or more pointers to related objects on the next higher level. The higher level object is called a parent and the lower level object is called a child. The pointers establish parent-child relationships. As the tree deepens it will eventually reach a point where no further branches are needed and all that remains is to collect the desired information about the subject matter of that level. The various bits of desired information are stored in user-defined fields of a data table. The data table is often the lowest level of any branch of the tree, although there could be additional data taken at higher levels as explained below.

Considering the example of FIG. 1, a tank car inspection task is shown, with level one indicated by the depiction of a tank car 10. There could be other tasks at level one, say, flat car and hopper car inspections (these are not shown in FIG. 1). Pointers 12 and 14 relate the tank car inspection task of level one to objects on level two, which are more detailed parts of such a task, namely, truck inspection 16 and coupler inspection 18. In this example tank car is the parent and truck and coupler are children. Similarly, the level two objects include pointers 20–28 to level three objects. For example, the level two parent truck inspection 16 object has child objects wheel 30, bolster 32 and side frame 34. A data table will be on level four (not shown in FIG. 1).

In the builder portion of the program, a "supervisor" user is asked to input his knowledge of his business into the program to build the list of objects, such as those of FIG. 1. The menu items are referred to herein as "structural" data. The structural data is input by the supervisor one time while setting up the system. The structural data at level one identifies the available tasks to be recorded in the field. In the example described there is an inspection task for railroad tank cars, hopper cars and flat cars. So tank, hopper and flat cars become a set of structural data that the program stores. The data includes the text or image that will appear in the menu. Next the builder portion of the program will ask the supervisor what objects are under each of the headings of the first level. Under tank car the supervisor user puts another set of structural data objects, e.g., truck 16 and coupler 18. Hopper car and flat car would each get their own group of objects. The builder program stores all that as structural data at level two. The level two objects also include a pointer identifying the parent object on the next higher level with which the level two object is associated. At level three under say, truck, there may be another set of structural data objects such as wheel, bolster and side frame, again with each level three object having a pointer identifying the associated parent objects on level two. Here again, all of this is structural "data" the builder program uses.

At some point the supervisor will get to a level where he needs no further breakdown and he is ready to accept what is referred to herein as "practical" data, the information about the real world things of interest to the user. When setting up the system under the builder program, the supervisor will define the data table containing the fields and their data types (numeric, date, alphanumeric, logical, graphical). The data table definitions could also be called structural data because they are concerned with the structure for the practical data and not the actual practical data itself. The data table defines the "blanks" which the user will fill in. The information with which the user fills the blanks is the practical data.

There may also be practical data at intermediate or upper levels of the tree. For example, at level one in addition to the tank car, hopper car, flat car objects there may be a practical data table that would contain information that would be needed regardless of car type. Thus, at level one the user may be asked to identify a car type and fill in a serial number, car owner, inspection date or the like. This information may then be displayed along with the menu prompts for lower levels.

Cross-links may be used to indicate a relation between objects in different branches. Using the above example, coupler and truck data are common to all three car types so when you get to the data table for practical data under hopper car, you may tell it to use the same coupler or truck data table as under tank car.

Conditional logical branching is also available for the supervisor user to include when defining the structural data. With logical branching the paths taken in the tree can depend on the practical data entered by the field user. For example, if "Operating" (the last line on the screen in FIG. 3, which is asking, is the car in operating condition) was "No", the next screen could be a detailed explanation form. If the answer is "Yes", no explanation is required and the explanation form is not even displayed. As another example, an inspector may be asked to rate the condition of a part as good, fair or poor. Depending on the rating entered, the next level may require no further action, request further data, or include an instruction to take appropriate remedial action. The logical branching can be specified to always occur, conditionally occur or dependently occur according to user input.

It can be seen that the tree structure arises not from some physical arrangement that objects are plugged into but from the use of pointers and the assumption that every object not on level one will point to a parent object until you arrive at a data table of practical data.

Figure 2:
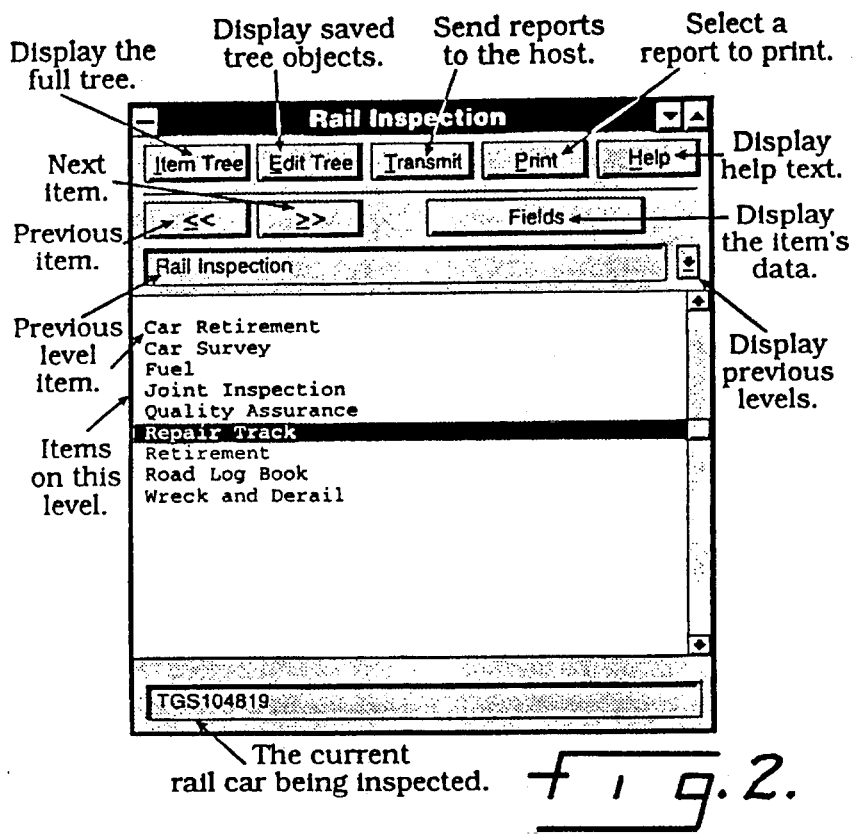
FIG. 2 is a sample of the main screen used by program.

Once the supervisor user fills in all the structural data the builder program is finished and will not be used again (until the supervisor wants to change the system). At the time of practical data collection the user in the field runs the so-called pen program. The pen program first goes and retrieves the structural data on the objects of level one and displays this data in a program-defined menu format. An example of this using the tank car task is shown in FIG. 2. When a field user makes a selection from level one (and fills in any level one practical data), the pen program checks for any pointers to the chosen object to find which set of child objects to display as level two. If there are level two objects, they are displayed in a program-designed screen format. This process continues until a data table is encountered. The field names or labels of the blanks to fill in are displayed and the user-types in the data, chooses from a pick list or otherwise enters the practical data. This is shown in FIG. 3.

Figure 3:
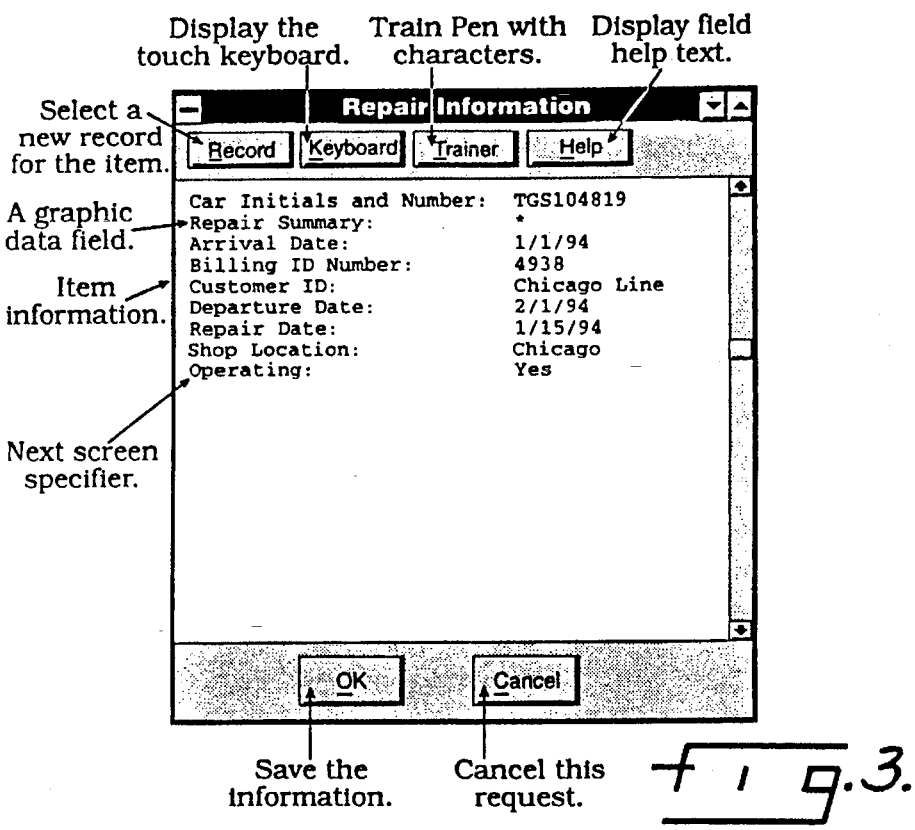
FIG. 3 is a sample of an information screen showing how a data table is filled with practical data.
Figure 4:
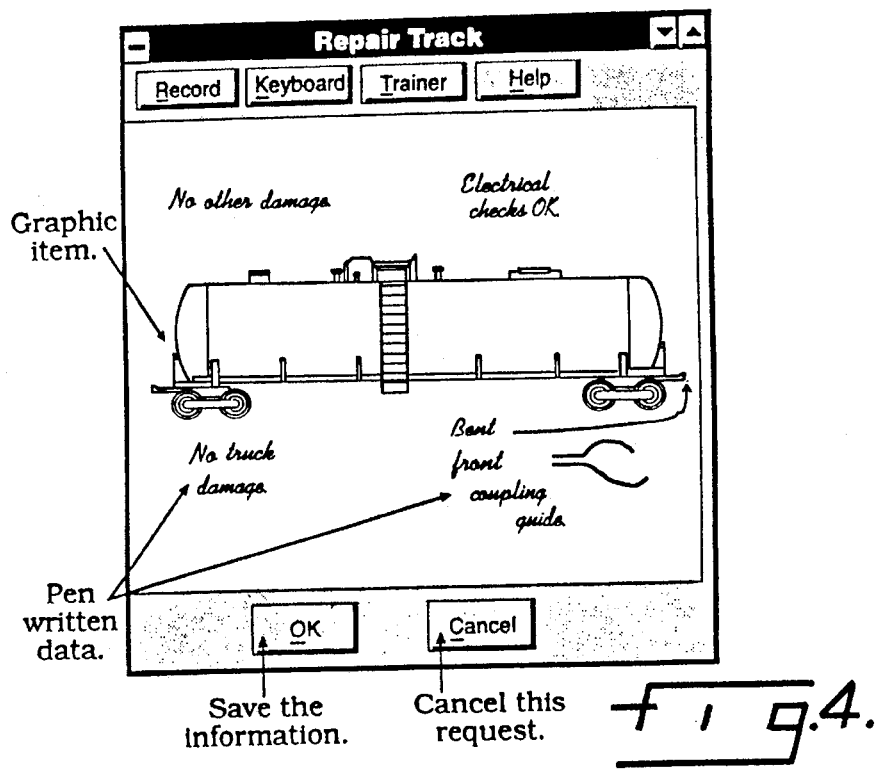
Figure 5:
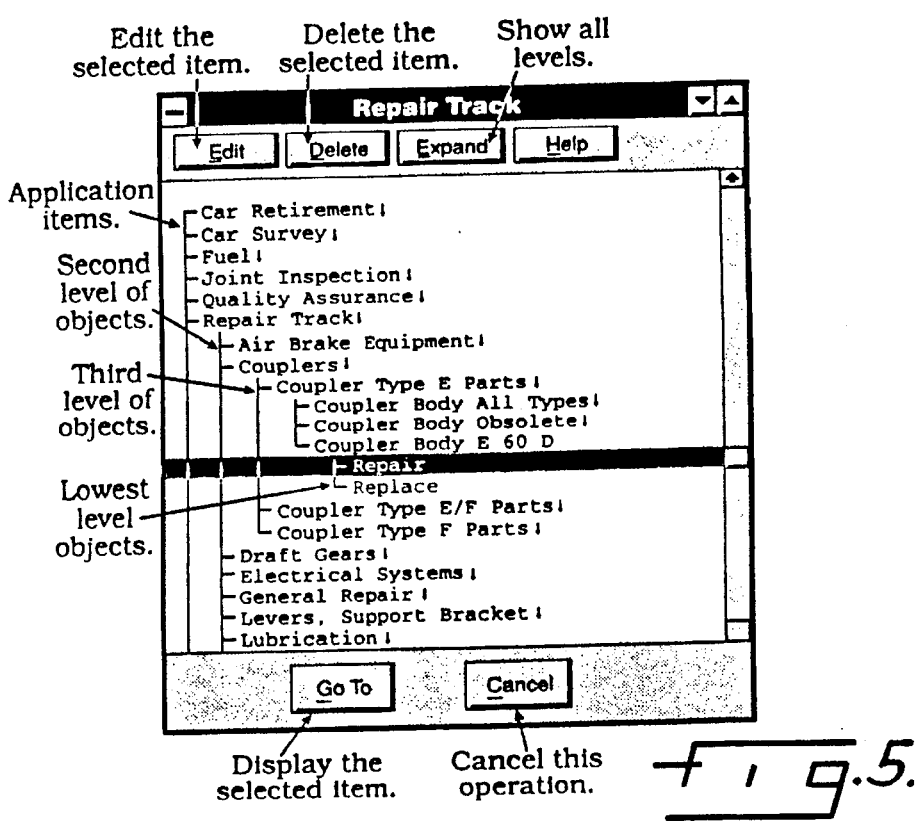

An alternative to the FIG. 3 type of screen is shown in FIG. 4. Here the practical data entry may include sketching or making notes on a graphical image of some sort. The practical data then comprises the graphical sketches or notes.

The data is stored with some indication of where it came from in the tree. This is so it will be known where common data came from. Coupler data, for example, could come from any of the tank car, hopper car or flat car branches of the tree. Level one practical data could also be used to identify practical data entered at lower levels.

It can be seen that since the builder and pen programs use the structural data in pre-designed screen and menu formats, the user does not have to know how to design such formats. Further, since the pointers are used to connect objects in the tree format, the user does not have to be concerned with how to organize or relate the data. On the other hand, information about the user's business can be incorporated no matter how wide or deep the tree structure because all that information is stored as structural data, not as application program code. This is why the program's source code does not have to change with each application. It does not change to suit a particular data gathering task the way general purpose database applications must be written for specific jobs.

Looking again at FIG. 2, it can be seen that the main screen displays one level of the tree. The serial number of the car being inspected is shown at the bottom of the screen. Touching an item moves you down one level. Items may also be displayed as pictures. In that case, touching a part of the picture takes you to that item. For example, touching a coupler takes you to the couplers object. The "Fields" button presents the data fields for an item so you can enter the practical data. Print and transmit buttons permit compilation of custom reports and transmission to a host computer.

The information screen of FIG. 3 presents the data fields for an object. Text and/or diagrams may be stored. When text information is required, a keyboard is displayed to pick or write characters. Or a pick list may be presented. Information saved on this screen automatically determines which item is used next. Field users do not need to know how the tree, or data, is organized.

The graphic screen of FIG. 4 can be used for display of a blank drawing page or to display a picture. On the picture the field user can draw or make notes. The handwritten notes or sketches are saved for reports. In FIG. 4 the rail car picture is provided by the supervisory user during setup. The text and simple diagrams are all written by the field user.

Figure 5:
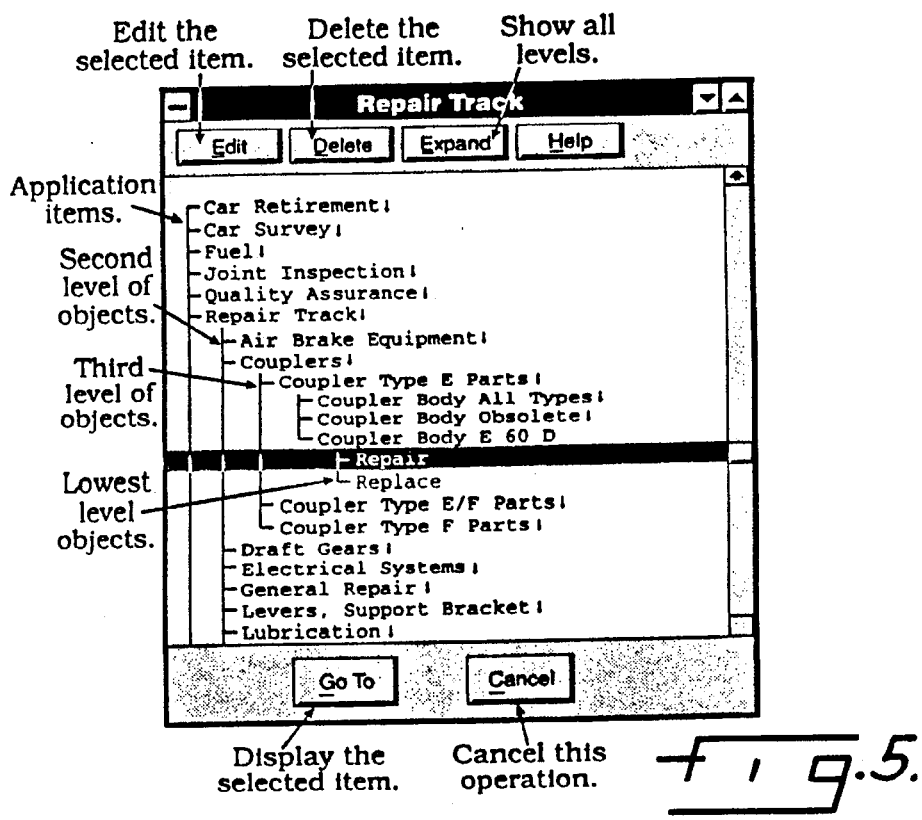
FIG. 5 is a sample of an edit tree screen showing a typical tree of structural data.

The edit tree screen of FIG. 5 displays several levels of a tree. Using this screen the user can locate and quickly jump to any item on any level. Levels can be expanded downward or compressed upward simply by touching them. Or, all levels of the tree can be presented by using the "Expand" button. The downward arrows indicate an object with lower levels. The "Edit" button displays information already saved for the selected object. There you can enter new information or edit a previous session. You can also use the "Delete" button to remove information.

While a preferred form of the invention has been shown and described, it will be realized that alterations and modifications may be made thereto without departing from the scope of the following claim.

We claim:

1. A method of creating a data gathering program which can be customized by a user for use in situ with a transportable computing device having a display screen, data storage means and input means for accepting user instructions, said method including the steps of providing fixed source code in the computing device which permits a user to perform the following functions:

inputting into the data storage means a plurality of levels of user-defined structural data objects representing the categories of information to be obtained from in situ data gathering, the levels proceeding from the general to the specific in terms of information detail;

inputting into the data storage means at least one user-defined data table structure containing user-defined fields representing the items of information to be obtained from in situ data gathering;

organizing the objects and tables into a tree structure by storing with each object a pointer directed to a related object or table in the next higher level;

providing a standardized screen format for displaying each level of structural data objects; and accepting input from an in situ user to select at least one of the structural data objects or fill in at least one of said fields.

2. The method of claim 1 further characterized in that when one of said structural data objects is selected by an in situ user the method further comprises the step of checking to see if a lower level object points to the selected object and displaying said lower level object if there is one.

3. The method of claim 1 further characterized in that when a field is filled in by an in situ user the method further comprises the step of storing the information filled in.

4. The method of claim 3 further comprising the step of storing with the information filled in an indication of where the information came from in the tree.

* * * * *